US012694332B2

(12) United States Patent

Deosthali et al.

(10) Patent No.: US 12,694,332 B2

(45) Date of Patent: Jul. 28, 2026

(54) DRIFT-TOLERANT MACHINE LEARNING MODELS

(71) Applicant: Oracle International Corporation, Redwood Shores, CA (US)

(72) Inventors: Nishad Deosthali, Sunnyvale, CA (US); Atin Modi, Agra (IN); Akshay Kumar, Jamshedpur (IN); Madalasa Venkataraman, Bangalore (IN); Sravan Kumar Ananthula, Frisco, TX (US)

(73) Assignee: Oracle International Corporation, Redwood Shores, CA (US)

( * ) Notice: Subject to any disclaimer, the term of this patent is extended or adjusted under 35 U.S.C. 154(b) by 988 days.

(21) Appl. No.: 17/944,927

(22) Filed: Sep. 14, 2022

(65) Prior Publication Data

US 2024/0086762 A1    Mar. 14, 2024

(51) Int. Cl.
*G06F 18/2113* (2023.01)
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | | |
|---|---|---|---|---|---|
| 12,165,017 | B1 * | 12/2024 | Grossman | ............... | G06F 17/17 |
| 12,307,385 | B2 * | 5/2025 | Bhide | .................... | G06N 20/00 |
| 12,339,926 | B1 * | 6/2025 | Maier | .................. | G06V 10/751 |
| 2005/0278322 | A1 * | 12/2005 | Fan | ......................... | G06N 20/00 |
| | | | | | 707/999.005 |
| 2008/0133434 | A1 * | 6/2008 | Asar | ...................... | G06N 20/10 |
| | | | | | 706/12 |
| 2020/0012900 | A1 * | 1/2020 | Walters | ............... | G06F 18/2415 |
| 2020/0380416 | A1 * | 12/2020 | Zion | ..................... | G06F 16/254 |
| 2021/0021631 | A1 * | 1/2021 | Okutan | ................. | H04L 63/164 |
| 2021/0224696 | A1 * | 7/2021 | Nasr-Azadani | .......... | G06N 5/01 |
| 2021/0390455 | A1 * | 12/2021 | Schierz | .................. | G06N 20/00 |
| 2022/0188694 | A1 * | 6/2022 | Suzani | ................... | G06N 3/045 |
| 2023/0066759 | A1 * | 3/2023 | Benoussaid | ........... | G06N 5/045 |
| 2023/0102152 | A1 * | 3/2023 | Roffe | .................. | G06F 11/3428 |
| | | | | | 705/7.37 |
| 2023/0126028 | A1 * | 4/2023 | Moyne | ..................... | G06N 3/08 |
| | | | | | 700/121 |
| 2023/0139718 | A1 * | 5/2023 | Valipour | ................ | G06N 3/006 |
| | | | | | 706/12 |

(Continued)

FOREIGN PATENT DOCUMENTS

| | | | | | |
|---|---|---|---|---|---|
| CN | 106803124 | B | * | 4/2020 | ............. G06N 20/00 |
| CN | 113740381 | A | * | 12/2021 | ............. G01N 27/00 |
| CN | 114492826 | A | * | 5/2022 | ............. G06N 3/045 |

(Continued)

*Primary Examiner* — Hassan Mrabi

(74) *Attorney, Agent, or Firm* — Invoke

(57) ABSTRACT

Techniques are disclosed for generating machine learning models that are insensitive to drift. A system trains a machine learning model using a divergent training dataset including synthesized data points simulating drift. The system can evaluate the machine learning models in terms of accuracy, latency, efficiency, and other metrics. Based on the evaluation, the system can select a machine learning model least susceptible to drift.

26 Claims, 6 Drawing Sheets

(56)              References Cited

U.S. PATENT DOCUMENTS

| | | | | |
|---|---|---|---|---|
| 2024/0005199 | A1* | 1/2024 | Butvinik | G06Q 20/4016 |
| 2025/0062777 | A1* | 2/2025 | Cooper | G06N 20/00 |

FOREIGN PATENT DOCUMENTS

| | | | | | |
|---|---|---|---|---|---|
| CN | 115015472 | A | * | 9/2022 | G01N 33/0004 |
| CN | 115358150 | A | * | 11/2022 | G06N 20/00 |
| DE | 102022109008 | A1 | * | 9/2023 | G06V 10/774 |
| EP | 4027277 | A1 | * | 7/2022 | G06N 5/046 |
| JP | 7640412 | B2 | * | 3/2025 | G06N 20/00 |
| WO | WO-2021044192 | A1 | * | 3/2021 | G06N 20/00 |
| WO | WO-2021257585 | A1 | * | 12/2021 | G06N 3/0464 |
| WO | WO-2022003007 | A1 | * | 1/2022 | G06N 20/00 |
| WO | WO-2022043512 | A1 | * | 3/2022 | G06N 7/01 |
| WO | WO-2022101452 | A1 | * | 5/2022 | G06N 3/042 |
| WO | WO-2022251355 | A1 | * | 12/2022 | G06F 18/22 |
| WO | WO-2023144831 | A1 | * | 8/2023 | H04W 24/02 |

* cited by examiner

DRIFT-TOLERANT MACHINE LEARNING MODELS

TECHNICAL FIELD

The present disclosure relates to machine learning. More specifically, the present disclosure relates to optimizing machine learning models for handling data drifts.

BACKGROUND

Machine learning models are trained to make predictions and inferences using historical data. The output of a machine learning model, therefore, depends on the data available at the time the model was trained. If data input to the machine learning model is outside the context and scope of the training data, the output may be inaccurate and inefficient.

In real world applications, data input to a machine learning model may progressively change over time due to trends in, for example, demographics, economics, linguistics, climate, fashion, etc. Such transformation of data is referred to as "drift." More specifically, "concept drift" or "data drift" includes changes in statistical properties of the target variable of a machine learning model over time that make predictions output by the machine learning model less accurate.

Drift can be especially problematic for production machine learning models. This is because a production machine learning model may be trained to operate over a wider range of contexts than a bespoke machine learning model focused on a specific task. Changes in real world conditions related to one of the operational contexts can cause rapid drift resulting in a production machine learning model operating at or beyond the edges of the model's intended scope. If the production machine learning model is not resilient or if the model is not retrained to adapt to the drift, the model may become unacceptably inaccurate and inefficient in some or all contexts.

The approaches described in this Background section are ones that could be pursued, but not necessarily approaches that have been previously conceived or pursued. Unless otherwise indicated, it should not be assumed that any of the approaches described in this section qualify as prior art.

BRIEF DESCRIPTION OF THE DRAWINGS

The embodiments described below are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ENVIRONMENT
3. SYSTEM ARCHITECTURE
4. DETERMINATION AND ANALYSIS OF DRIFT EFFECTS
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

The present disclosure is directed to systems, methods, and non-transitory computer-readable storage mediums for generating machine learning models that are robust and tolerant of drift. One or more embodiments train and evaluate a machine learning model using divergent data simulating data drift. Some embodiments determine a divergent dataset based on a baseline dataset of training data points by synthesizing data points diverging from the baseline dataset. Some embodiments select related attributes in the baseline dataset and generate divergent data points for the selected attributes. For example, generating divergent data points can include determining relationships among the attributes, modifying the relationships to generate a new set of relationships among the attributes, and generating the divergent data set based on the new set of relationships among the attributes.

Using the divergent data points as inputs to the machine learning model, some embodiments can determine the effects of drift to, for example, analyze test cases or "what if" scenarios. Determining the effects of drift can include evaluating the performance of the machine learning model using the divergent dataset as an input. The evaluation can score the machine learning models in terms of accuracy, latency, efficiency, and other metrics. Based on the evaluation, some embodiments issue one or more alerts indicating whether the machine learning model failed to adapt to the divergent data points.

Additionally, some embodiments can determine one or more candidate machine learning models using the divergent dataset. The evaluation can rank the candidate machine learning models in terms of accuracy, latency, efficiency, and other metrics. Based on the ranking, users can select the best machine learning models least susceptible for deployment, as well as identify the contextual limits of the selected machine learning model prior to deployment.

One or more embodiments described in this Specification and/or recited in the claims may not be included in this General Overview section.

2. System Environment

Figure 1:
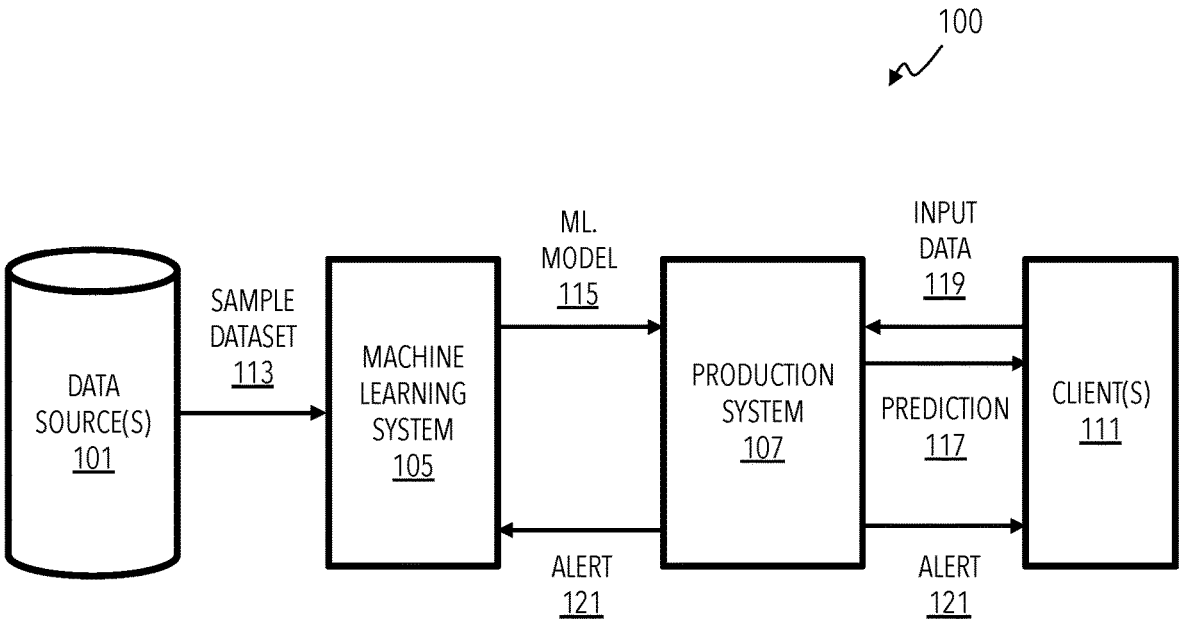
FIG. 1 illustrates a system environment in accordance with one or more embodiments.

FIG. 1 shows a flow block diagram illustrating an example environment 100 for implementing systems and processes in accordance with aspects of the present disclosure. The environment 100 includes one or more data sources 101, a machine learning system 105, a production system 107, and one or more clients 111.

The data source 101 can be any type of data repository or information library, including public, commercial, proprietary, or special-purpose data providers. In one or more embodiments, the data source 101 can be a machine learning library, such as COMMONCRAWL, WIKIPEDIA®, KAGGLE, and the UCI MACHINE LEARNING REPOSITORY. The data source 101 can also be a database of information maintained by an information management system. For example, a customer management application can maintain a database of business information (e.g., sales, inventory, financial, organizational, personnel, technology, vendors, customers, etc.). Further, the data source 101 can be a data acquisition system that stores information from sensors. For example, a manufacturer or service system may generate and store sensor data and corresponding metadata (e.g., time, data, location, events, etc.).

The machine learning system 105 can be one or more computing systems configured to process data, such as sample dataset 113, obtained from the data source 101 to train and evaluate a machine learning model 115 for execution by the production system 107 used by the clients 111. As described in greater detail below, embodiments of the machine learning system 105 can determine a divergent training dataset from the sample set 113 simulating drift and other data changes. For example, the machine learning system 105 can simulate drift by selectively oversampling or under-sampling data attributes in the sample dataset 113. The machine learning system 105 can also simulate drift by adding noise to some or all of the data points in the sample data set 113. By synthesizing selected data attributes, a user can evaluate the performance of the machine learning model 115 in hypothetical scenarios or test cases diverging from the scope of the sample dataset 113. Further, the user can modify the parameters used to generate the divergent dataset to evaluate various a hypothetical scenarios or test cases in which a machine learning model may be expected to operate. Additionally, using the divergent dataset, the machine learning system 105 can determine one or more candidate machine learning models 115. The machine learning system 105 can also execute the candidate machine learning models and evaluate the models' accuracy and performance metrics. Based on the evaluation information, the machine learning system 105 can analyze the effect of drift and select best-performing machine learning model 115 for deployment to the production system 107 from the baseline model or the candidate models.

The production system 107 can be one or more computing systems configured to generate predictions 117 based on input data 119 from the client 111 using the machine learning model 115 determined by the machine learning system 105. The client 111 may be a terminal, a web browser, a mobile application, or other software application communicatively coupled to the production system 107. The production system 107 can also monitor operation of the machine learning model 115. The monitoring can include analyzing changes in the input data 119 to detect drift. For example, the production system 107 can determine an amount of divergence between the current input data 119 and baseline data, such as in sample dataset 113. The monitoring can also include measuring an accuracy of the predictions 117 output by the machine learning model 115. For example, the production system 107 can compare the current accuracy of the machine learning model 115 of prediction 117 to baseline accuracy using the baseline data. Additionally, monitoring the performance of the machine learning model 115 can include determining performance information of the machine learning model 115 processing the input data 119.

For example, the production system 107 can determine whether latency of the machine learning model 115 in generating predictions 117 form the input data 119 exceeds one or more predetermined performance thresholds. Based on the monitoring, the production system can issue alerts 121 when one or more of the input data 119 the accuracy of the predictions 117 and the performance of the machine learning model 115 exceeds one or more predefined thresholds. The alert 121 can warn an operator of the machine learning system 105 and the client 111 of the machine learning model's 115 issues indicating, for example, an inability to adapt to the divergent data points. The alert 121 can also indicate the machine learning model 115 requires retraining.

The components illustrated in FIG. 1 may be local to or remote from each other. Individual components may be distributed over multiple applications and/or machines. Also, multiple components may be combined into one application and/or machine. Operations described with respect to one of components may instead be performed by another component. In one or more embodiments, the environment 100 may include more or fewer than are illustrated in FIG. 1. For example, functionality of one or more of the components can be combined into a single system.

3. System Architecture

Figure 2:
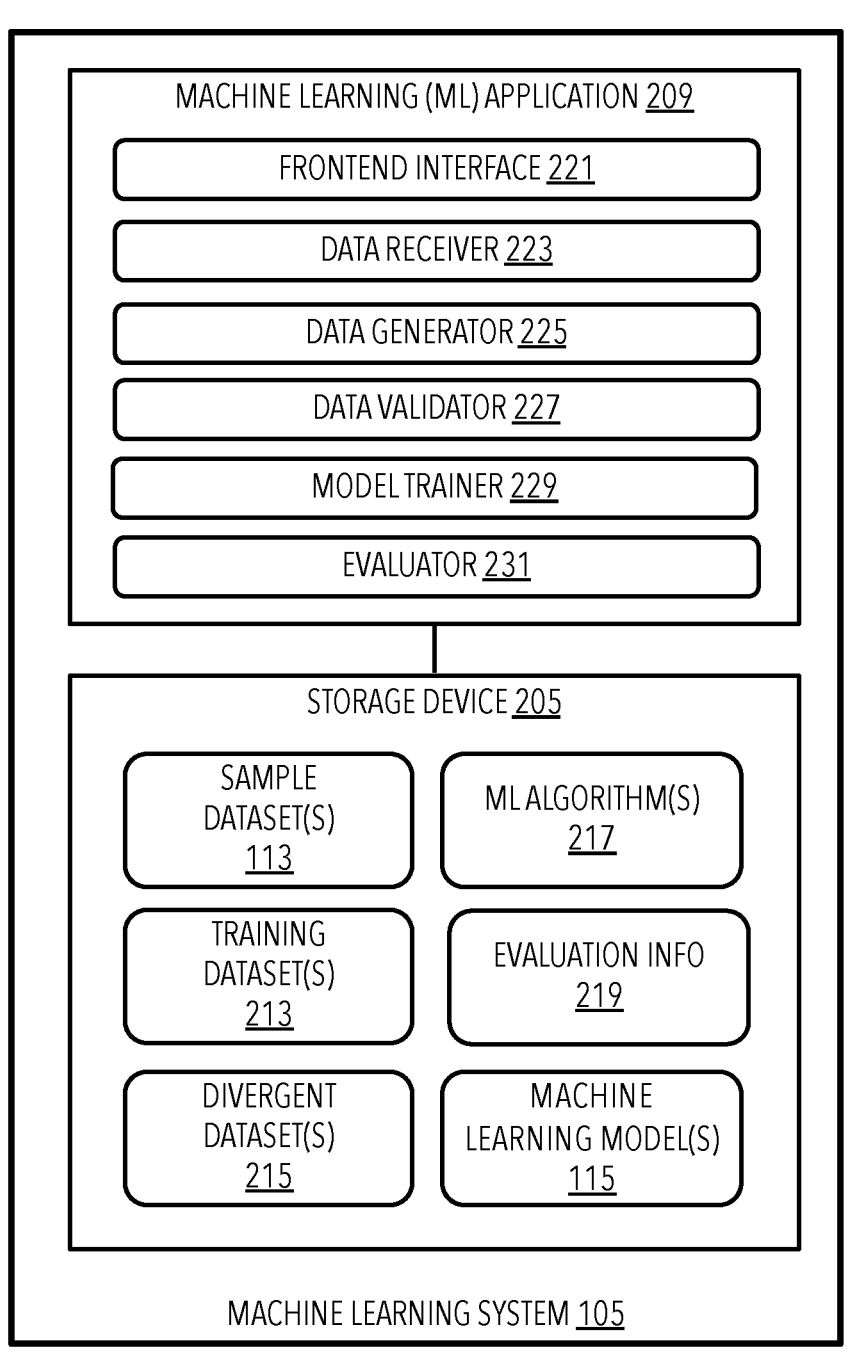
FIG. 2 illustrates a system in accordance with one or more embodiments.

FIG. 2 illustrates a machine learning system 105 in accordance with one or more embodiments. The machine learning system 105 can be the same or similar to that previously described above. Embodiments of the machine learning system 105 can be implemented on one or more digital devices. A digital device can be any hardware device that includes a processor. Some embodiments of a digital device may refer to a physical device executing an application or a virtual machine. Examples of digital devices include a personal computer, a tablet, a laptop, a desktop, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

The machine learning system 105 can include a storage device 205 and a machine learning application 209. The storage device 205 can be one or more hard disk drives, flash drives, a compact disk read-only memory (ROM), a digital versatile disk (DVD) optical storage technology, or other suitable fixed, non-transitory computer-readable storage device. The storage device 205 can store computer-readable program instructions (e.g., applications, software modules, and other program code) and information (e.g., libraries and data) for operation of the machine learning system 105. Further, the storage device 205 can store one or more of sample data set 113, one or more machine learning models 115, one or more training datasets 213, one or more divergent datasets 215, machine learning algorithms 217, and evaluation information 219. It is understood that some or all of the information used by the machine learning system 105 can be stored remotely, such as in the data source 101 or some other data repository or storage system.

The sample datasets 113 and the machine learning models 115 can be the same or similar to those described above. A training dataset 213 can be a structured set of data including some of all of a sample dataset 113 which has been cleaned and organized into structured data according to a schema. Cleaning the sample dataset 113 can include converting the information, which may be image, categorical, or ordinal data, into numeric data. Cleaning sample dataset 113 can also include ignoring missing values, for example, by removing irrelevant information included in the source data 112. Additionally, cleaning the sample dataset 113 can include filling missing information by estimation. For example, the machine learning system 105 can estimate values by determining mean, median, or highest frequency values. Moreover, cleaning the sample dataset 113 can include detecting and removing outliers that drastically deviates from other observations.

The divergent datasets 215 can be a structured set of data reflecting data points included in the training dataset 213 and including synthetic data points generated based on some or all of the training data set 213, as described in greater detail below. Some embodiments of the divergent dataset 215 can be entirely comprised of synthetic data points. Some embodiments of the divergent dataset 215 can include a combination of the training data set 213 and synthetic data points. For example, divergent datasets 215 can include synthetic data oversampling and adding noise to data points corresponding to related attributes (e.g., height and weight).

The machine learning algorithms 217 can include supervised machine learning algorithms and unsupervised machine learning algorithms. In some examples, any one or more of the machine learning algorithms 217 may be embodied by linear regression, logistic regression, linear discriminant analysis, classification and regression trees, naïve Bayes, k-nearest neighbors, learning vector quantization, support vector machine, bagging, and random forest, boosting, back propagation, neural network, and/or clustering models.

The evaluation information 219 can be metrics, scores and ranks one or more of the machine learning models 115. For example, the metrics can be statistical measures indicating divergence from a baseline value (e.g., variance and standard deviation). As described below, the evaluation information 219 represent accuracy and performance of individual machine learning models 115.

The machine learning application 209 can be configured to determine one or more machine learning models 115 by training machine learning algorithms 217 using the training datasets 213 or the divergent datasets 215. One or more embodiments of the machine learning application 209 includes a frontend interface 221, a data receiver 223, a data generator 225, a model trainer 229, and an evaluator 231.

The frontend interface 221 can be software, hardware, or a combination thereof providing a computer-user interface that manages interactions between a user and components of machine learning application 209. The frontend interface 221 can be configured to render user interface elements and receive input via the user interface elements. For example, frontend interface 221 may generate interactive webpages and/or other graphical user interface (GUI) elements. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

The frontend interface 221 can include features that enable a user to view sample datasets 113, clean and classify the sample datasets 113 into training datasets 213, control the machine learning system 105 to selectively generate divergent datasets 215 using the training datasets 213, and validate the divergent datasets 215. Furthermore, the frontend interface 221 can control the machine learning system 105 to determine the machine learning models 115 along with performance metrics and rankings of the machine learning models 115. In some examples, using the frontend interface 221, the user may cause execution of operations that measure drift, accuracy, and performance of the machine learning models 115 produced by the machine learning system 105. These latter features enable a user to evaluate and compare data and models analyzed by the machine learning system 105.

The data receiver 223 can be software, hardware, or a combination thereof that constructs training datasets 213 from sample datasets 113. Constructing a training dataset 213 can include cleaning the sample data 113. Additionally, constructing the training dataset 213 can include conforming the training dataset 213 to a schema defining data types of attributes and attribute relationships in the data schema. For example, the schema can be captured as a definition from a table or as an ad hoc schema definition input on the screen by a user using the frontend interface 221. The data receiver 223 may identify characteristics associated with data items in the training datasets 213 and generate corresponding feature vectors that represent the identified characteristics. For example, the data receiver 223 may identify related attributes of data points of the training datasets 213 that trained machine learning model 115 is intended to analyze.

The data generator 225 can be software, hardware, or a combination thereof that determines one or more divergent datasets 215. Using the training datasets 213, the data generator 225 can generate divergent data points for one or more attributes in the training datasets 213. For example, via the frontend interface 221, the user can use data generator 225 to select attributes in training dataset 213 for oversampling or undersampling in the divergent datasets 215. Additionally, the user can select one or more attributes to add noise. By doing so, the user can implement "what if" scenarios that stress-test a machine learning model 115 by generating data diverging from the scope of the baseline training dataset 213.

One or more embodiments of the data generator 225 can use different data synthesis techniques to generate divergent data points. Data synthesis techniques can include generative adversarial networks (GANs), which use algorithms that learn patterns from input datasets and automatically create new examples resemble training data. Data synthesis techniques can also include adversarial machine learning, which generates examples that disrupt a machine learning model and injects them into training data sets. Data synthesis techniques can further include neural style transfer, which blend content image and style image and separate style from content. Additionally, data synthesis techniques can include drawing numbers from a distribution by observing real statistical distributions and reproducing synthetic data. This technique also includes the creation of generative models. It is understood that existing data synthesis software, such as CARLA and AUGLY, can be used to generate the synthetic data.

The data validator 227 can be software, hardware, or a combination thereof that determines statistics and data relationships between the attributes of the divergent dataset 215 that indicate metrics about data types in the training dataset 213. For example, the data validator 227 can detect drift by analyzing the dataset using multiple metrics, such as statistical measures.

The model trainer 229 can be software, hardware, or a combination thereof that determines machine learning models 115 using the training datasets 213 and the divergent datasets 215. The model trainer 229 may be in communication with a user via the frontend interface 221, through which a user can select a machine learning type (e.g., classification or regression), an algorithm 217 for that type, and attributes or hyperattributes for the algorithm. In some embodiments, the training algorithm 133 can be a classification algorithm, such as K-Nearest Neighbor, Naive Bayes, Random Forest, Support Vector Machine, and Logistic Regression. The training algorithm can also be a regression algorithm, such as Linear Regression, Support Vector Regression, Decision Tress/Random Forest, and Gaussian Progresses Regression. During training, weights of the algorithm 133 are optimized by minimizing loss, as defined by a loss function. Hyperattributes can be, for example, a learning rate, batch size, and a weight decay. Using selected hyperattributes, the model trainer 229 trains a machine learning model by fitting trainable attributes of a selected machine learning algorithm 217.

The evaluator 231 can be software, hardware, or a combination thereof that runs machine learning models, determines evaluation information 219, and stores the evaluation information 219 from historical runs and allows user to compare and track the best performing models. The evaluator 231 may be in communication with a user via the frontend interface 221, through which a user can cause the model evaluator 231 to select attributes for evaluation, execute the models, generate metrics, evaluate the metrics, compare different machine learning models, and rank the machine learning models based on the metrics. The evaluation information 219 can include metrics indicating, for example, accuracy and performance. Accuracy metrics can be measures accuracy of the machine learning models' 115 predictions. Performance metrics can be measures of the machine learning models' 115 resource utilization, including CPU/GPU usage, model runtime, latency, etc. The utilization can be used to estimate hardware costs and understanding if hardware downgrade/upgrade is required (e.g., better GPU, more RAM, and the like). Additionally, each model run has a detailed report on performance across various data points. The evaluator 231 can rank the machine learning models 115 using on the evaluation information 219. Based on the rankings, a user can select a best-ranked machine learning model 115 for deployment to a production system (e.g., production system 107), or create a baseline for further data and model scenarios and test cases.

In one or more embodiments, the system 200 include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

4. Determination and Analysis of Drift Effects

Figure 3A:
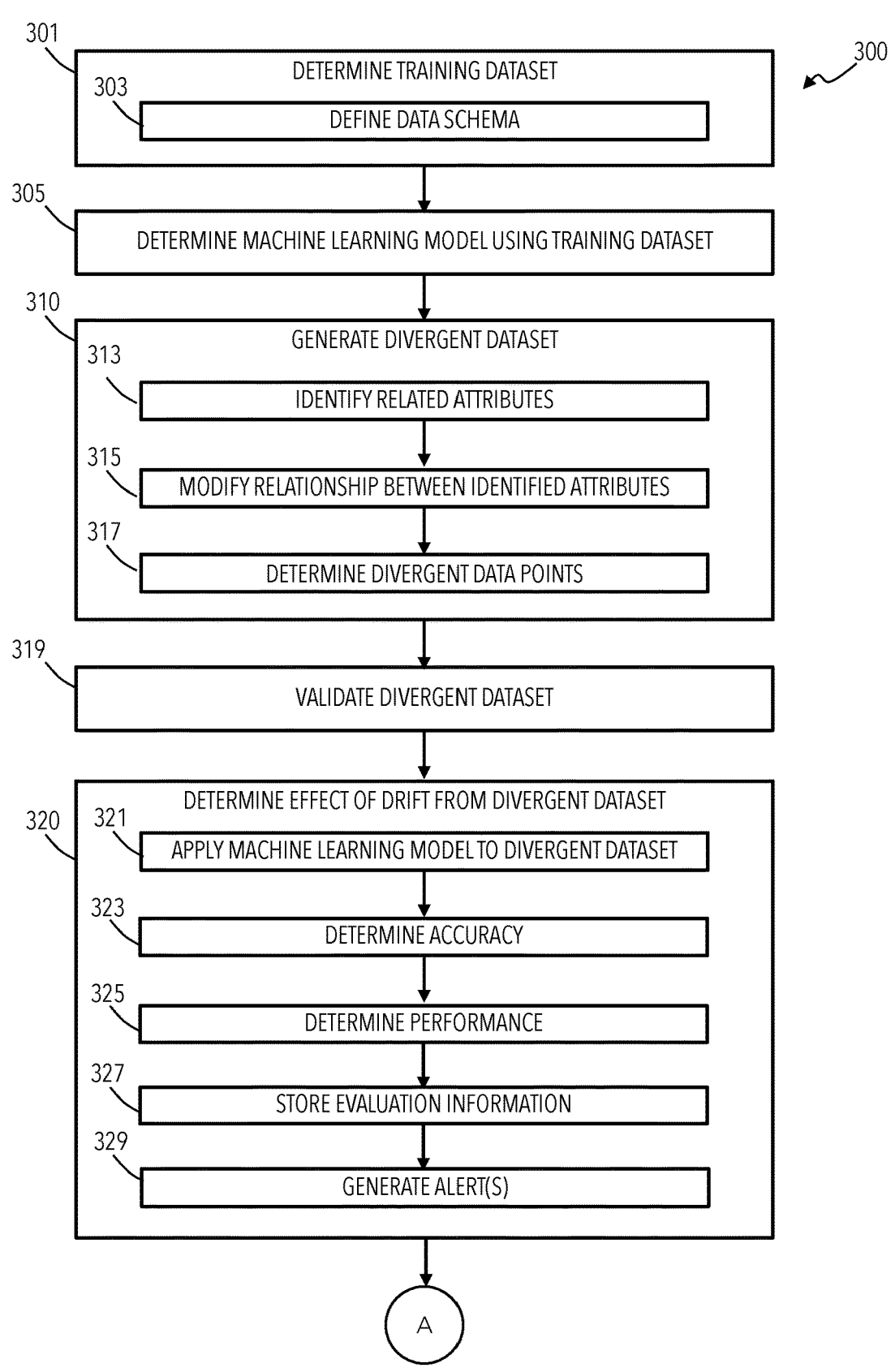
FIGS. 3A and 3B illustrate an example set of operations for determining and evaluating machine learning models in accordance with one or more embodiments.
Figure 3B:
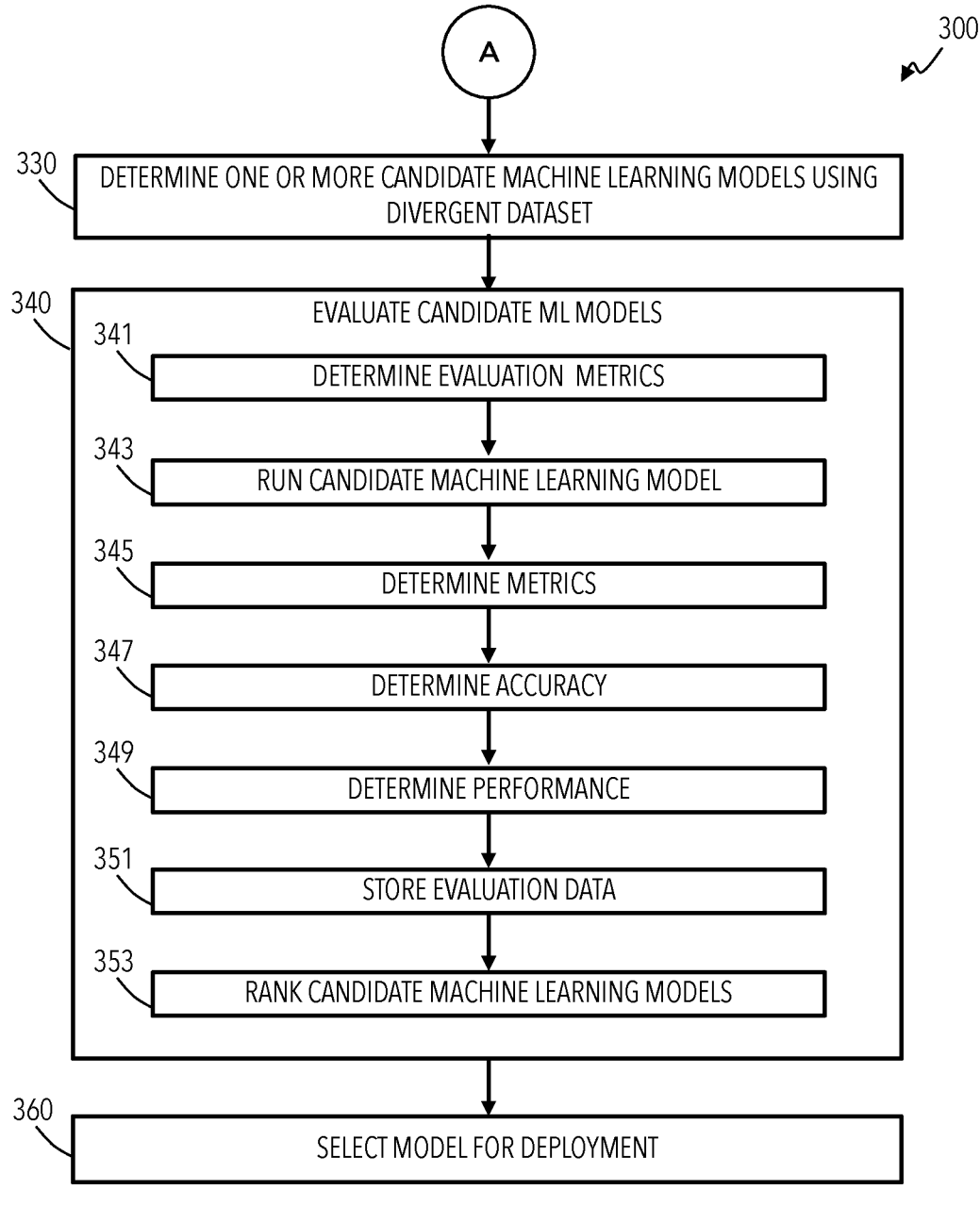

The flow diagrams in FIGS. 3A and 3B illustrate functionality and operations of systems, devices, processes, and computer program products according to various implementations of the present disclosure. Each block in FIGS. 3A and 3B can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 3A and 3B. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

At block 301, the process 300 determines (e.g., using data receiver 223) a training data set (e.g., training dataset 213). Determining the training dataset can include obtaining and cleaning a sample dataset (e.g., sample dataset 113) from a data source (e.g., data source 101). Additionally, determining the training dataset can include, at block 303, defining a data schema for the training set. The data schema can specify respective types and attributes for the data in the training dataset. Additionally, the data schema can define entity relationships between attributes. For example, the schema can include fields linking two or more related attributes. In some schemas, the linking field includes or refers to an algorithm defining a mathematical association between a first attribute (e.g., height) and a second attribute (e.g., weight). A statistical model may be used to fit a function based on a set of data points. As an example, a regression model may generate a function that computes height based on weight, or computes weight based on height. The system can determine the data schema based on user inputs or by importing a predetermined dataset file. For example, a schema input into the model can be captured as a definition from a predefined table (e.g., spreadsheet), as a persisted table or view defined internally within the system, or as an ad hoc schema definition input through a user interface.

At block 305, the process 300 determines a machine learning module using the training dataset determined at block 301. Determining the machine learning model can include training a machine learning algorithm based on the training data set. For example, via a user interface (e.g., frontend interface 221), a user can interact with a machine learning model training software (e.g., using model trainer 229) to select a machine learning type (e.g., classification or regression), an algorithm for the machine learning type (e.g., machine learning algorithm 217), and hyperattributes for the algorithm.

At block 310, the process 300 generates (e.g., using data generator 225) a divergent dataset (e.g., divergent dataset 215) based on the training dataset determined at block 301. In accordance with aspects of the present disclosure, the divergent dataset comprises synthesized data points diverging from the data points included in the training data set. By synthesizing certain data points in the training data, the process 300 allows testing the effects of data outside the scope of the training dataset on the machine learning model.

In one or more embodiments, determining the divergent dataset can include, at block 313, identifying related attributes of data points in the training dataset determined at block 301. For example, via a user interface a user can identify the related attributes, such as height and weight of individuals. Determining the divergent dataset can also include, at block 315, modifying the relationship between the attributes identified at block 313. For example, height and weight attributes may be regional, such that individuals in a first region have a different height/weight ratio than a second region. The training dataset 213 may use an algorithm including parameters predicting height/weight in the first region. Modifying the relationship can include changing values of parameters of a height/weight algorithm to values corresponding to the second region, instead of the first region.

Additionally, determining the divergent dataset can include, at block 317, determining divergent data points using the training dataset determined at block 301 and the modified relationship between the attributes modified at block 315, wherein the relationships between attributes in the divergent data points differ from relationships between attributes in the training data points. Determining the divergent data points can use rule-based generation, random value-based generation (e.g., Monte Carlo), or GAN-based generation. The rule-based generation can compute the divergent data points as a function of the training data points, such that the training dataset and the divergent datasets are tied together. For example, a deterministic function can process numerical values of the training data points to generate the divergent data points. In some rule-based generation, the training data points respectively correspond to data points in an n-dimensional vector space, wherein at least one deterministic function is applied to (a) identify a region of an n-dimensional vector space that does not include any of the training data points, and (b) select the divergent data points from the region of the n-dimensional vector space. Also, the rule-based generation can apply at least one non-deterministic function to the one or more numerical values in the training data points, or apply at least one non-deterministic function to an output of the at least one deterministic function. Further, values for a particular attribute in the training data points can span a different range of numerical values than values for the particular attribute in the divergent data points.

Moreover, determining the divergent data points can include determining a quantity of divergent data points to generate. Some embodiments receive a user input specifying a quantity of the training dataset to be divergent. For example, via a user interface, user can select a range from 0% divergent data to 100% divergent data. Synthesizing divergent data points, identifying parameters for the synthesizing. For example, the user can indicate oversampled or undersampled the identified attributes in the training dataset to in the divergent dataset. Identifying parameters for the synthesizing can also include adding noise to some or all of the attributes. A user can synthesize data points for all attributes in the training dataset, or synthesize data points for a selected subset of the attributes in the training dataset. For example, via a user interface, a user select certain attributes (e.g., height and weight) for synthesizing divergent data points.

At block 319, the process 300 validates (e.g., using data validator 227) the data points in the divergent dataset generated at block 310. The validating can assess the drift or other data changes in the divergent dataset generated at block 310. Validating the divergent data can include calculating metrics and data relationships between the attributes of the training dataset and the divergent dataset. The metrics can include, for example, means, medians, modes, standard deviations, and other statistical measures of the data. In some embodiments, prior to making any predictions based on the divergent data set determined at block 310, the process evaluates the data points of the divergent dataset for consistency with the data points of the baseline training dataset. The evaluation can identify one or more inconsistencies between the data points of the divergent data set and the training dataset. For example, the evaluation can include statistical comparison of the divergent data set and the training dataset to determine metrics indicating relative variance, mean, median, mode, and standard deviations of the data points. Based on the metrics, the evaluation can trigger notifications of divergence and drift resulting from the modified relationship between the attributes. In addition, certain combinations or relationships can trigger alerts. For example, the evaluation can detect nonsensical values and issue alerts (e.g., an individual's height being zero or greater than 9 feet).

At block 320, the process 300 determines the effect of drift from the divergent dataset generated at block 310 on the machine learning model determined at block 305. Determining the effect of the drift can include, at block 321, applying the machine learning model to the divergent dataset to generate outputs (e.g., predictions). Determining the effect of the drift can also include, at block 323, determining an accuracy of the machine learning model based on the outputs. For example, the process 300 can determine metrics indicating correct true/false predictions and SHAP (SHapley Additive exPlanation) values. Additionally, determining the effect of the drift can include, at block 325, determining performance of the machine learning model in determining the outputs. Performance can include resources utilized by the machine learning model while running, such as processor usage, model runtime, latency, and the like. Further, determining the effect of the drift can include, at block 327, storing the evaluation information determined at blocks 323, 325, and other metrics. The stored evaluation information can include a summary of the evaluation metrics generated.

Moreover, determining the effect of the drift can include, at block 329, generating one or more alerts based on the evaluation information stored at block 327, including drift, accuracy, and performance. In some embodiments, an alert comprises an indication of whether the trained machine learning model adapted to the divergent data. The indication can be based on the accuracy determined at block 323 and the performance determined at block 325. For example, determining whether the trained machine learning model adapted to the divergent data set based on a difference between (a) the accuracy of the predictions corresponding to the divergent data set, and (b) an accuracy of predictions corresponding to the first plurality of data points. For example, an alert can be generated when accuracy drops by a predetermined threshold (e.g., greater than 10%), indicating the baseline machine learning model did not adapt. Also, determining whether the trained machine learning model adapted comprises determining a resource usage for application of the trained machine learning model on the divergent data set. For example, an alert can be generated when any one of latency or processing (e.g., CPU cycles) increases by more than a predetermined threshold (e.g., 20%). Further, determining the effect of the data drift on the trained machine learning model comprises determining whether predictions by the trained machine learning model meet a performance criterion. For example, operational requirements for a production machine learning model may demand that the model generates outputs in accordance with predetermined set of criteria, such as greater than 99% accuracy, less than 0.01 milliseconds latency, and less than 5.0% of CPU capacity.

Continuing to FIG. 3B via off-page connector "A," at block 330, the process 300 determines (e.g., using model trainer 229) one or more candidate machine learning models (e.g., machine learning model 115) using the divergent dataset. Determining the machine learning model can be performed in a same or similar manner as described regarding block 305. At block 340, the process 300 evaluates (e.g., using evaluator 231) the candidate machine learning models determined at block 330 to determine information (e.g., evaluation information 219) for comparison of the machine learning models with one another and/or with the baseline machine learning module determined at block 305.

Evaluating the machine learning models can include, at block 341, configuring the model and evaluation metrics representing accuracy and performance. Evaluating the machine learning mode can also include, at block 343, running the machine learning model on the divergent dataset and recording the metrics configured at block 341.

Evaluating the machine learning model can also include, at block 347, determining accuracy of the model run at block 343 based on the metrics recorded at block 345. and determining performance of the model run at block 343 based on the metrics recorded at block 345. Determining the accuracy and performance can be performed in a same or similar manner to that preciously describe above regarding block 319. Evaluating the machine learning mode can also include, at block 351 storing the metrics and ranking information. The stored evaluation information can include a summary of the evaluation metrics generated. Evaluating the machine learning mode can also include, at block 353, ranking the machine learning model in comparison to other models based on the stored performance data (e.g., evaluation information 219). For example, the stored evaluation information can include a ranking of models based on the target metrics. Using the ranking and evaluation information, different models can be compared (e.g., A/B-tested) based on their respective accuracy and performance to identify the best model across different model attributes and data distributions.

At block 360, the process 300 selects a machine learning for deployment. User can save the best model to create the baseline for further data and model experiments. Saving the base model saves the model attributes, hyperattributes, runtime information, and the model file for scoring new datasets. A most optimized model that accommodates changes in data with robust model metrics across wide ranges of data and with satisfactory non-functional (latency, cost) performance metrics can be chosen for deployment.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims. In the present example embodiment, a machine learning model is trained to predict a clothing size distribution of retail customers (e.g., extra-small, small, medium, large, and extra-large) for estimating future inventory needs of one or more clothing retailers. As described above, a ratio of the customers' height and weight ("height/weight ratio") may be regional, such that customers in a first region have a different height/weight ratio than customers in a second region. Accordingly, the machine learning model trained using training data from the first region may have issues with accuracy and performance if executed on data form the second region. The machine learning model may also have issues if changes in demographics cause sizes of customers in the first region to diverge from the scope of the training data originally used to generate the machine learning model. In accordance with aspects of the present disclosure, a user may desire to analyze the drift tolerance of the machine learning model when executed on inputs from the second region or the divergent inputs of the first region.

Figure 4:
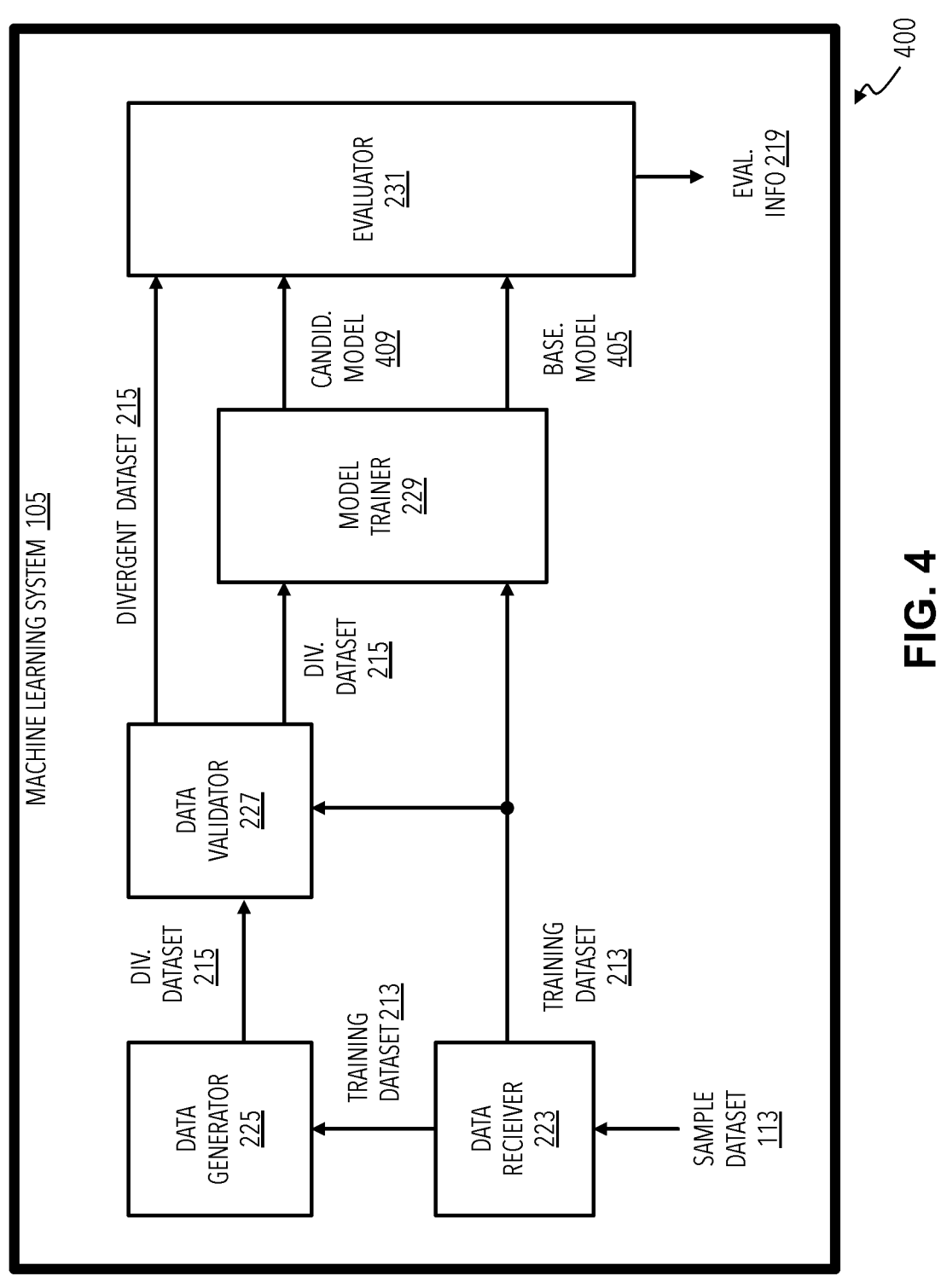
FIG. 4 illustrates a process flow diagram of an example system in accordance with one or more embodiments.

FIG. 4 illustrates an example of process flow diagram 400 for determining and evaluating effects drift and other changes on data machine learning models using a machine learning system 105. The machine learning system 105 can include a data receiver 223, a data generator 225, a data validator 227, a model trainer 229, and an evaluator 231, all of which can be the same or similar to those previously described above. As illustrated in FIG. 4, the data receiver 223 can receive a sample dataset 113 for an intended machine learning model 108. For example, a user can obtain the sample dataset 113 from a library of retail customer profiles in the first region, including customer identification (customer ID, name, address, etc.), demographic information (e.g., location, age, gender, etc.), physical information (e.g., height, weight, etc.), and purchase history (items, type, size, cost, etc.). The data receiver 223 can generate a baseline training dataset 213 by cleaning the sample dataset 113 and conforming the data points included in the sample dataset to a schema associating data classes (e.g., "CustomerID") with data types (e.g., string, number). The data schema can also define entity relationships between correlated attributes, such as height and weight, as previously described above.

The model trainer 229 can determine a baseline machine learning model 405 for the first region using the training dataset 213, as previously described herein. It is understood, however, that the baseline machine learning model 405 can be a preexisting model (e.g., production model 115.). To analyze the effect of applying data from the second region to the baseline machine learning model 405, the user can determine a divergent dataset 215 using the data generator 225. As described above, determining the divergent dataset 215 can include identifying related attributes in the training dataset 213 for generate divergent data points. For example, as height/weight ratio may be highly correlated to the target clothing sizes, the user can modify the relationship between the height and weight attributes of customers in the first region to reflect the height and weight attributes of customers in the second region. In some instances, the first region can be relatively shorter and heavier, and the second region can be relatively taller and lighter. As described above, the relationship between height and weight attributes can be modeled by an algorithm. The user may modify parameters of the algorithm such that the algorithm models the height/weight ratio of the second region differently than the first region.

To control the output of the data generator 225, the user can select parameters for synthesizing the divergent dataset 215. For example, the user can select an attribute (e.g., height), a synthesis generator (e.g., Gaussian), attributes for the generator (e.g., start, end, prefix, sand suffix) and dependent attributes (e.g., weight). The user can also define a total number of data points to be generated the data generator 225. For example, the user can input metadata for synthesizing the data, including a number of records (e.g., 400) and a synthesis algorithm (e.g., Deep Network).

Using the divergent dataset 215, the data validator 227 can determine summary statistics and data relationships between the height and weight attributes of the divergent dataset 215. The summary statistics provide information about the divergent dataset 215 based on data types, including identifying drift detection based on metrics. For example, the data validator 227 can generate a list of metrics of divergent dataset 215 attributes, such as distribution, mean, median mode, standard deviation, quantities of values in the dataset, and missing values, observations within one standard deviations (%), observations within two standard deviations (%), observations within three standard deviations (%), negative outliers (%), positive outliers (%), missing values (%), minimum value, maximum value, negative value, unique values, and zero values. The use can select attributes for comparison based of their respective metrics to capture the data drift based on the difference of relevant summary metrics of the two datasets. Using the metrics, the data validator 227 can identify inconsistencies between the data points of the training dataset 213 and data points of the divergent data set 215. For example, the data validator 227 can indicate when a data point of the divergent data set 215 is more than two standard deviations from the corresponding data point of the training dataset 213.

Additionally, using the divergent dataset 215 and the baseline machine learning model 405, the evaluator 231 can determine evaluation information 219 summarizing the effect of drift on the baseline machine learning model 405. Determining the evaluation information 219 can include executing the baseline machine learning model 405 on the divergent dataset 215. The outputs of the baseline machine learning model 405 can include predictions of customer size distributions using the divergent dataset 215 having the modified relationship between height and weight of the customers in the second region Based on the execution of the baseline machine learning model 405, the evaluator 231 can compare the accuracy and performance of the baseline machine learning model 405 for the divergent dataset 215 to the accuracy and performance of the baseline machine learning model 405 for the training dataset 213. The evaluation information 219 can include a summary of the evaluation metrics generated by the evaluator. For example, the evaluation information 219 indicate the accuracy baseline machine learning model 405 dropped from 90% for the training dataset 213 to 70% for the divergent dataset, which may indicate that the baseline model poorly adapted to the simulated data drift. Further, determining the effect of the data drift can determine CPU usage for application of the trained machine learning model on the divergent data set consumes more than 25% of capacity, for example. Different criteria and thresholds can be used in other embodiments.

Additionally, for comparison testing with the baseline machine learning model 405, the user can use the model trainer 229 to configure and generate one or more candidate machine learning models 409 using the divergent dataset 215. The evaluator 231 can execute the candidate machine learning models 409 to determine evaluation information 219 for the candidate machine learning models 409 in a same or similar manner to that determined for the baseline machine learning model 405. The evaluation information 219 can include metrics describing the accuracy and performance of the candidate machine learning models 409. As described above, the evaluation information 219 can indicate performance across various data points such that a user can determine the best machine learning model 108 to be saved as a production model, or as a baseline for comparison with further machine learning models 108. For example, via the user interface, the user can compare evaluation information 219 of the baseline machine learning model 405 and candidate machine learning models 409. The best-performing machine learning model can be saved in the data storage 205 to create the baseline for further data and model experiments along with model attributes, hyperattributes, runtime information, and the model file for scoring new datasets.

Other examples consistent with the above can encompass different scenarios, such as determining and evaluating drift in due to sudden changes in consumer behavior. In one such example, a machine learning model is trained to forecast the sales of personal care consumer goods product (e.g., face care, body care, hand cleanser). The forecast can be further used to make other pricing and marketing decisions on different product sub-categories, such as such as hand cleanser, sanitizers, and the like. However, events such as a pandemic can suddenly change the consumer behavior and corresponding product demand. Accordingly, the example machine learning model trained on pre-pandemic data would have issues with accuracy and performance when executed on post-pandemic data. For example, the example machine learning model may not have predicted a sudden surge in demand and sales of personal hygiene products due to the pandemic and, thereby, cause the model to under-forecast. Embodiments consistent with those described herein (e.g., as described regarding FIGS. 3A, 3B, and 4) enable a user to analyze the drift tolerance and remediation of the machine learning model when executed on inputs for such skewed consumer behavior.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, multiple tenants may share the database.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. In some examples a graphics processing unit (GPU) may be adapted to perform the methods described above. The special-purpose computing devices may be desktop computer systems, portable computer systems, handheld devices, networking devices or any other device that incorporates hard-wired and/or program logic to implement the techniques.

Figure 5:
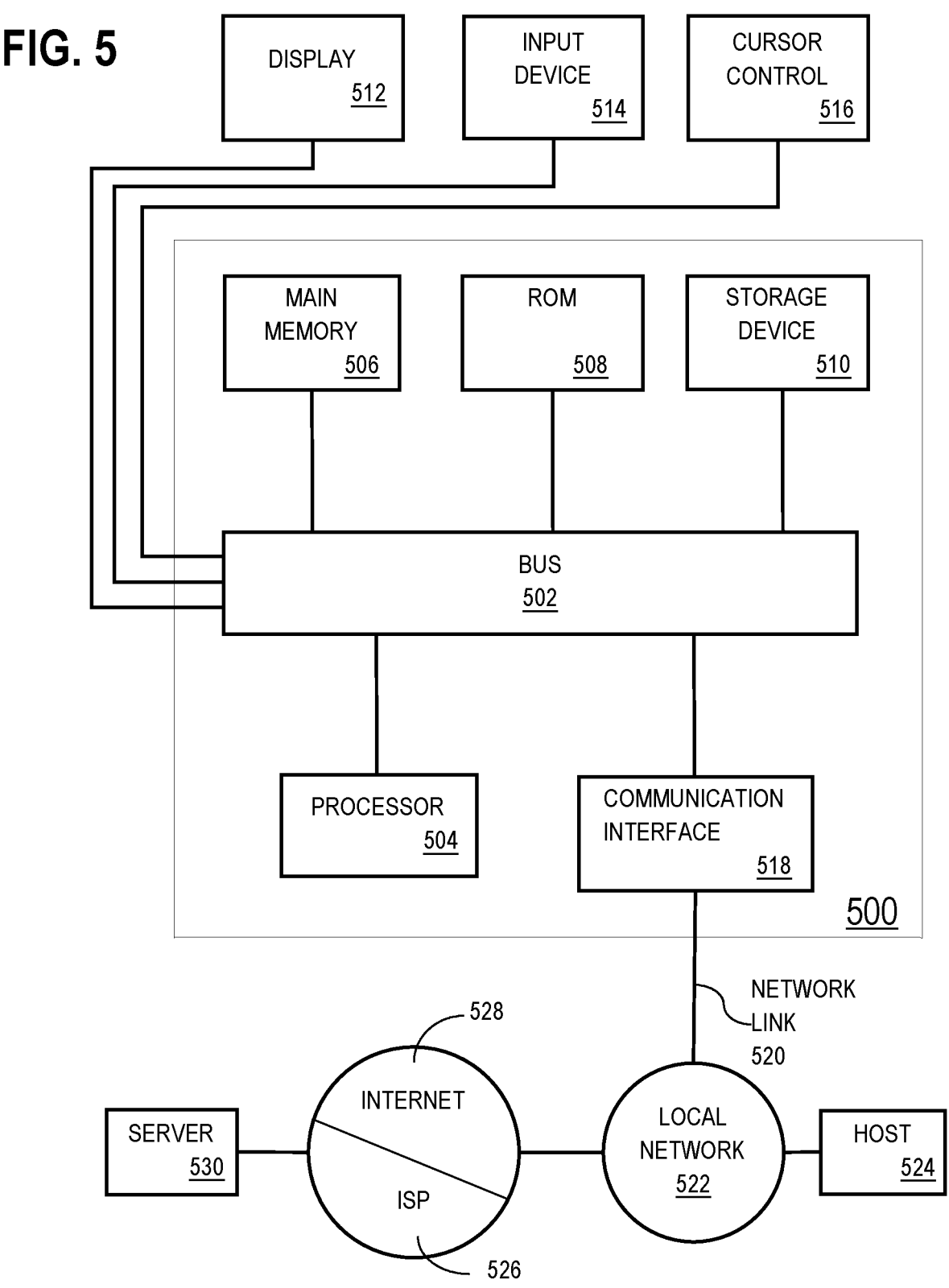
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 630 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable storage medium comprising instructions which, when executed by one or more hardware processors, causes performance of operations comprising:

determining a training data set comprising a first plurality of data points;

generating a trained machine learning model by training a machine learning algorithm using the training data set;

determining an effect of data drift on the trained machine learning model at least by:

applying at least one deterministic function to one or more numerical values in the first plurality of data points to generate a divergent data set comprising a second plurality of data points that diverges from the first plurality of data points;

obtaining a set of results by applying the trained machine learning model to the divergent data set; and based on the set of results, determining the effect of the data drift on the trained machine learning model;

determining whether or not the trained machine learning model failed to adapt to the divergent data set based on the effect of the data drift;

based on determining whether or not the trained machine learning model failed to adapt to the divergent data set, performing one of:

generating and deploying an updated machine learning model by executing computing resources to retrain the machine learning algorithm using the divergent data set if the trained machine learning model failed to adapt to the divergent data set; and refraining from using computing resources to generate the updated machine learning model if the trained machine learning model adapted to the divergent data set.

2. The medium of claim 1, wherein: the first plurality of data points correspond respectively to data points in an n-dimensional vector space, wherein applying the at least one deterministic function comprises:

identifying a region of an n-dimensional vector space that does not include any of the first plurality of data points; and selecting the second plurality of data points from the region of the n-dimensional vector space.

3. The medium of claim 1, wherein generating the divergent data set is based further on (a) applying at least one non-deterministic function to the one or more numerical values in the first plurality of data points, or (b) applying the at least one non-deterministic function to an output of the at least one deterministic function.

4. The medium of claim 1, wherein values for a particular attribute in the first plurality of data points spans a different range of numerical values than values for the particular attribute in the second plurality of data points.

5. The medium of claim 1, wherein generating the divergent data set comprises:

determining one or more relationships among attributes of the data points in the first plurality of data points;

determining one or more new relationships among the attributes by modifying the one or more relationships; and generating the divergent data set based on the one or more new relationships among the attributes.

6. The medium of claim 1, wherein generating the divergent data set comprises generating the second plurality of data points such that relationships between attributes in the second plurality of data points differ from relationships between attributes in the first plurality of data points.

7. The medium of claim 1, wherein determining the effect of the data drift comprises:

generating an alert identifying the data drift; and the effect of data drift comprises an identification of the data drift by the trained machine learning model.

8. The medium of claim 1, wherein the set of results comprise predictions by the trained machine learning model corresponding to the divergent data set.

9. The medium of claim 8, wherein determining the effect of the data drift comprises determining an accuracy of the predictions by the trained machine learning model corresponding to the divergent data set.

10. The medium of claim 9, determining the effect of the data drift further comprises determining whether the trained machine learning model adapts to the divergent data set based on the accuracy of the predictions corresponding to the divergent data set.

11. The medium of claim 9, determining the effect of the data drift further comprises:

determining whether the trained machine learning model adapts to the divergent data set based on a difference between: the accuracy of the predictions corresponding to the divergent data set and an accuracy of predictions corresponding to the first plurality of data points.

12. The medium of claim 1, determining the effect of the data drift comprises:

determining a resource usage for application of the trained machine learning model on the divergent data set.

13. The medium of claim 1, wherein the operations further comprise:

prior to making any predictions based on the divergent data set comprising the second plurality of data points, evaluating the divergent data set for consistency with the first plurality of data points;

identifying an inconsistency between the first plurality of data points and the second plurality of data points; and triggering a notification based on the inconsistency between the first plurality of data points and the second plurality of data points.

14. The medium of claim 1, wherein determining the effect of the data drift on the trained machine learning model comprises determining whether predictions by the trained machine learning model meet one or more performance criteria.

15. A method comprising:

determining a training data set comprising a first plurality of data points;

generating a trained machine learning model by training a machine learning algorithm using the training data set;

determining an effect of data drift on the trained machine learning model at least by:

applying at least one deterministic function to one or more numerical values in the first plurality of data points to generate a divergent data set comprising a second plurality of data points that diverges from the first plurality of data points;

obtaining a set of results by applying the trained machine learning model to the divergent data set; and based on the set of results, determining the effect of the data drift on the trained machine learning model, determining whether or not the trained machine learning model failed to adapt to the divergent data set based on the effect of the data drift;

based on determining whether or not the trained machine learning model failed to adapt to the divergent data set, performing one of:

generating and deploying an updated machine learning model by executing computing resources to retrain the machine learning algorithm using the divergent data set if the trained machine learning model failed to adapt to the divergent data set; and refraining from using computing resources to generate the updated machine learning model if the trained machine learning model adapted to the divergent data set, wherein the method is performed by at least one device comprising a hardware computer processor.

16. The method of claim 15, wherein: the first plurality of data points correspond respectively to data points in an n-dimensional vector space, wherein applying the at least one deterministic function comprises:

identifying a region of an n-dimensional vector space that does not include any of the first plurality of data points; and selecting the second plurality of data points from the region of the n-dimensional vector space.

17. The method of claim 15, wherein generating the divergent data set is based further on (a) applying at least one non-deterministic function to the one or more numerical values in the first plurality of data points, or (b) applying the at least one non-deterministic function to an output of the at least one deterministic function.

18. The method of claim 15, wherein values for a particular attribute in the first plurality of data points spans a different range of numerical values than values for the particular attribute in the second plurality of data points.

19. The method of claim 15, wherein generating the divergent data set comprises:

determining one or more relationships among attributes of the data points in the first plurality of data points;

determining one or more new relationships among the attributes by modifying the one or more relationships; and generating the divergent data set based on the one or more new relationships among the attributes.

20. The method of claim 15, wherein generating the divergent data set comprises generating the second plurality of data points such that relationships between attributes in the second plurality of data points differ from relationships between attributes in the first plurality of data points.

21. The method of claim 15, wherein determining the effect of the data drift comprises:

generating an alert identifying the data drift; and the effect of data drift comprises an identification of the data drift by the trained machine learning model.

22. The method of claim 15, wherein the set of results comprise predictions by the trained machine learning model corresponding to the divergent data set.

23. The method of claim 22, determining the effect of the data drift further comprises:

determining whether the trained machine learning model adapts to the divergent data set based on a difference between an accuracy of the predictions corresponding to the divergent data set and an accuracy of predictions corresponding to the first plurality of data points.

24. The method of claim 15, determining the effect of the data drift comprises determining a resource usage for application of the trained machine learning model on the divergent data set.

25. The method of claim 15, further comprising:

prior to making any predictions based on the divergent data set comprising the second plurality of data points, evaluating the divergent data set for consistency with the first plurality of data points;

identifying an inconsistency between the first plurality of data points and the second plurality of data points; and triggering a notification based on the inconsistency between the first plurality of data points and the second plurality of data points.

26. A system comprising one or more hardware processors and a non-transitory computer-readable medium storing program instructions that, when executed by the one or more hardware processors, causes performance of operations comprising:

determining a training data set comprising a first plurality of data points;

generating a trained machine learning model by training a machine learning algorithm using the training data set;

determining an effect of data drift on the trained machine learning model at least by:

applying at least one deterministic function to one or more numerical values in the first plurality of data points to generate a divergent data set comprising a second plurality of data points that diverges from the first plurality of data points;

obtaining a set of results by applying the trained machine learning model to the divergent data set; and based on the set of results, determining the effect of the data drift on the trained machine learning model;

determining whether or not the trained machine learning model failed to adapt to the divergent data set based on the effect of the data drift;

based on determining whether or not the trained machine learning model failed to adapt to the divergent data set, performing one of:

generating and deploying an updated machine learning model by executing computing resources to retrain the machine learning algorithm using the divergent data set if the trained machine learning model failed to adapt to the divergent data set; and refraining from using computing resources to generate the updated machine learning model if the trained machine learning model adapted to the divergent data set.

\* \* \* \* \*